B. R. COLE.
Method of Opening and Closing Gates.
No. 25,808.
Patented Oct. 18, 1859.
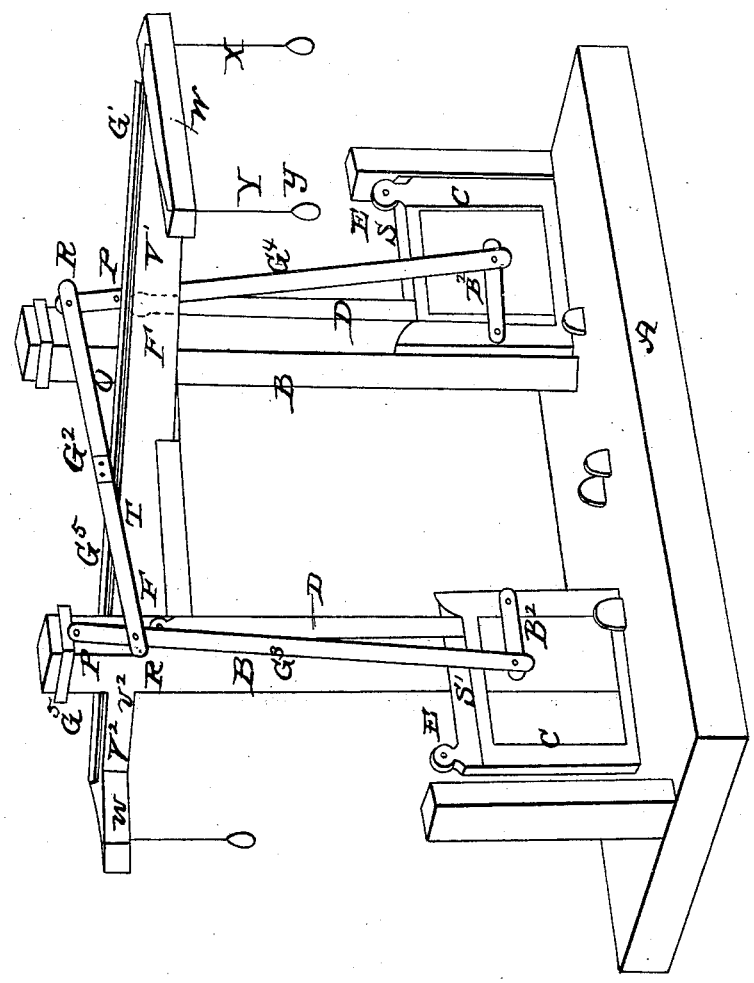

UNITED STATES PATENT OFFICE.

B. R. COLE, OF GENEVA, NEW YORK.

METHOD OF OPENING AND CLOSING GATES.

Specification of Letters Patent No. 25,808, dated October 18, 1859.

*To all whom it may concern:*

Be it known that I, B. R. COLE, of the village of Geneva, county of Ontario, and State of New York, have invented a new and Improved Method of Opening and Shutting Farm and other Gates; and I do hereby declare that the following is a full and accurate description thereof, reference being had to the accompanying drawings and to the letters and figures of reference marked thereon.

A is the surface of the ground or foundation on which the gate is erected; B, B, the side upright ports of the gate with a cross bar connecting them at the top part of it seen at T; C, C, C, C the two portions of the gate represented as being open; D, D long slats with pulleys or rollers F, F, at the upper end resting and rolling on the bar $s$ which is fastened to the cross piece T and by which means one side of each half of the gate is suspended and ready to move F F pulleys resting on the ways S, S and by which the side of each half of the gate is in position to move V′ V², two pieces of suitable timber mortised into the cross piece T at right angles to the same at each end of which at the outer extremity other short pieces W, W, are framed at right angles to V′, V².

$G^1$, is a lever with a pin through it at O.

$G^2$, is a 2d lever or oscillating bar firmly fixed at the end of $G^1$, yet so as to allow a change of its angle with $G^1$, when the levers are operated in throwing it from side to side.

$G^3$ and $G^4$ are levers attached at P and P to the gate posts so as move around the pins or bolts P, P. They are also connected with the oscillating bar $G^2$, at R, R one end of $G^2$ being above the other end below P, P, respectively.

$G^5$ and $G^6$ are two levers joined in the middle of the beam or timber $V^2$ so as to reverse their operation on $G^2$ against that produced by G′ G′.

The operation of this system of levers is as follows: The gates are now open and the outer end of the lever $G^1$ is drawn toward the left the cord X with the weight on the end of it having been drawn down this cord passing over a pulley in the right end of W and being fastened to the end of G′. To shut the gates, pull the cord V which passes in like manner over a pulley in the left hand end of W and is attached to the end of G′ which is thereby drawn to the left the other end beyond O is carried to the right and along with it the oscillating bar $G^2$ which carries with it the top of the lever $G^4$ and sends the bottom of it which is connected with the short lever or bar $B^2$ to the left and along with it goes the half gate to its place in contact with the other half gate which meets it in the middle of the space between the posts at the same time, for while $G^4$ moves at top to the right $G^3$ must move at top to the right that is to say all the portion of it below P. The bottom or lower end of $G^3$ must also move to the right and being connected with the short bar $B^2$ which is connected with the half gate the gate itself is thus carried forward and closed. The levers on the opposite side of the gate operate substantially in the same way the only exception being the arrangement for a reverse motion as already mentioned the free motion of the gates is provided for by the pulleys E E and F F by which the gates are suspended.

I do not claim broadly as my invention the use of bars pulleys levers or the suspending of the gates, but What I do claim is—

The attachment of the bar $G^2$ to the respective levers $G^3$ and $G^4$ at such points as to give their lower ends the same motion inward or outward at the same time, as in my description above substantially set forth.

B. R. COLE.

Signed in presence of—
W. F. CURRY,
GEO. R. DUSINBERG.